US012663755B2

(12) United States Patent
Boardman et al.

(10) Patent No.: US 12,663,755 B2
(45) Date of Patent: Jun. 23, 2026

(54) HOLOGRAPHIC PROJECTOR AND METHOD

(71) Applicant: Envisics Ltd, Milton Keynes (GB)

(72) Inventors: Edward Boardman, Milton Keynes (GB); Timothy Smeeton, Milton Keynes (GB); Hugo Malin-Clegg, Milton Keynes (GB); Daniel Burnham, Milton Keynes (GB); Alexander Cole, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 255 days.

(21) Appl. No.: 18/495,546

(22) Filed: Oct. 26, 2023

(65) Prior Publication Data

US 2024/0241478 A1 Jul. 18, 2024

(30) Foreign Application Priority Data

Jan. 13, 2023 (GB) ..................................... 2300506

(51) Int. Cl.
*G03H 1/22* (2006.01)
(52) U.S. Cl.
CPC ......... *G03H 1/2205* (2013.01); *G03H 1/2294* (2013.01); *G03H 2001/221* (2013.01);
(Continued)
(58) Field of Classification Search
CPC ............... G03H 1/2205; G03H 1/2294; G03H 2001/221; G03H 2001/2234;
(Continued)

(56) References Cited

U.S. PATENT DOCUMENTS 9,766,456 B2 9/2017 Christmas et al.
2004/0008399 A1 1/2004 Trisnadi
(Continued)

FOREIGN PATENT DOCUMENTS

EP 2028653 A1 2/2009
EP 2073198 A1 6/2009
(Continued)

OTHER PUBLICATIONS

Combined Search and Examination Report under Sections 17 and 18(3), Application No. GB2300506.9, mailed Jul. 20, 2023, 7 pages.

*Primary Examiner* — Dmitriy Bolotin
(74) *Attorney, Agent, or Firm* — McDonnell Boehnen Hulbert & Berghoff LLP

(57) ABSTRACT
A holographic projector includes a display device arranged to form a holographic wavefront by spatially modulating light in accordance with a hologram of a picture. The holographic projector includes a magnification system including a first and second lens. The first lens is arranged form a holographic reconstruction of the picture by focusing the holographic wavefront towards a front focal plane of the first lens. The holographic reconstruction of the picture includes a plurality of pixels. The holographic projector includes a kinoform disposed between the first and second lens and arranged to apply a phase-delay to each pixel of the holographic reconstruction. The holographic projector includes a movement assembly arranged to move the kinoform such that a plurality of different phase-delays are applied to each pixel. The kinoform includes an array of zones and is arranged such that the width of each zone is substantially equal to the distance between adjacent pixels.

20 Claims, 12 Drawing Sheets

(52) U.S. Cl.
CPC . *G03H 2001/2234* (2013.01); *G03H 2223/17* (2013.01); *G03H 2223/23* (2013.01); *G03H 2223/26* (2013.01)

(58) Field of Classification Search
CPC ........... G03H 2223/17; G03H 2223/23; G03H 2223/26; G03H 2223/13; G03H 2223/14; G03H 2223/16; G03H 2223/18; G03H 2223/55; G03H 2227/03; G03H 1/32; G03H 1/0443; G03H 1/0808; G03H 1/16; G03H 1/22; G03H 1/2202; G03H 1/2249; G03H 2223/50; G03H 2001/2239; G02B 27/48; G02B 27/0103; G02B 2027/0145; G02B 2027/0154; G03B 21/142
See application file for complete search history.

(56) References Cited

U.S. PATENT DOCUMENTS

| | | | |
|---|---|---|---|
| 2009/0161072 A1 | 6/2009 | Yamauchi | |
| 2011/0002019 A1* | 1/2011 | Routley | ............... G03H 1/2294 |
| | | | 353/38 |
| 2011/0216390 A1 | 9/2011 | Tong | |
| 2012/0002256 A1 | 1/2012 | Lacoste | |
| 2012/0013880 A1* | 1/2012 | Choi | .................... G02B 3/0062 |
| | | | 359/569 |
| 2019/0187614 A1 | 6/2019 | Oh | |
| 2019/0212544 A1 | 7/2019 | Heber | |
| 2022/0252879 A1 | 8/2022 | Christmas et al. | |
| 2022/0404770 A1 | 12/2022 | Christmas et al. | |
| 2023/0019309 A1* | 1/2023 | Chriki | .................. G03B 21/208 |
| 2023/0064690 A1 | 3/2023 | Smeeton et al. | |
| 2023/0204953 A1 | 6/2023 | Smeeton et al. | |
| 2024/0168433 A1* | 5/2024 | Jang | ................. G02F 1/134363 |
| 2024/0241478 A1* | 7/2024 | Boardman | ........... G03H 1/2294 |
| 2024/0288826 A1* | 8/2024 | Christmas | .......... G02B 27/0081 |
| 2025/0053006 A1* | 2/2025 | Cole | .................... G03H 1/2294 |
| 2025/0053136 A1* | 2/2025 | Cole | .................... G03H 1/2294 |
| 2025/0291131 A1* | 9/2025 | Hollinger | .............. G02B 15/15 |

FOREIGN PATENT DOCUMENTS

| | | |
|---|---|---|
| WO | 2007068978 A1 | 6/2007 |
| WO | 2014/209431 A1 | 12/2014 |
| WO | 2016/136060 A1 | 9/2016 |

* cited by examiner

HOLOGRAPHIC PROJECTOR AND METHOD

CROSS-REFERENCE TO RELATED APPLICATIONS

This application claims the benefit of priority of United Kingdom Patent Application No. 2300506.9 filed Jan. 13, 2023, which is hereby incorporated herein by reference in its entirety.

FIELD

The present disclosure relates to a holographic projector and method of holographic projection. More specifically, the present disclosure relates a holographic projector and method for processing a holographic reconstruction to remove/reduce the perception of speckle. Even more specifically, the present disclosure relates to removing or reducing speckle caused by the interference between pixels of high resolution images by rapidly applying varying phase-delays to pixels of a holographic reconstruction. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In general terms, there is provided a holographic projector and a method of holographic projection. The hologram that is projected is a hologram of a picture. The holographic projector and projection method are arranged to reduce/minimise the perception of speckle (or speckle-like interference patterns) in a holographic reconstruction of the picture (when viewed by a viewing system).

Holographic projectors typically comprise a coherent light source such as a laser. It is well known that the use of coherent light can lead to unwanted interference patterns being formed. That is, the coherent light might interfere with itself. This can create noise (which is not external noise). In the case of holographic projectors, this noise can degrade the image quality of (virtual) images formed using the holographic projector. One example of this phenomena is referred to as "speckle".

A first source of speckle results from diffuse reflections from (imperfect surfaces). In particular, imperfections in a reflection surface can create fluctuations/subtle phase changes in different portions of an image—such as a holographic reconstruction—reflected by the surface. These phase changes result in spatially varying constructive and/or destructive interference causing light and dark areas in the projected (virtual) image.

A second source of speckle (or, more accurately, speckle-like noise) arises when the images/holographic reconstructions that are formed by the holographic projector have a relatively high resolution—i.e. relatively high density of image pixels or dots per inch. It is generally desirable for images formed by holographic projectors to be sufficiently high resolution so as to not have the appearance of being pixelated. For an image not to appear pixelated, the points of light/pixels that form that image must be sufficiently close together that they cannot be separated by the eye. However, placing the points of light/image pixels that form the image too close can cause interference between adjacent points/pixels. In particular, cross-talk between light associated with adjacent pixels of the holographic reconstruction causes a speckle-like or grain-like pattern. This interaction/interference may result in a pattern of constructive interference and destructive interference such that there are (unintentional) relatively bright and (unintentional) relatively dark areas in a holographic reconstruction of the picture formed by the holographic projector. This pattern may be considered an image pixel crosstalk. However, this pattern is referred to in this disclosure as speckle-like noise or speckle for shorthand. For example, fine details of the image, such as text, become hard to view/read. In an image formed of red, green and blue light of specific wavelengths, colour variation from the intended colour of the image may be exhibited because of different speckle patterns produced by the red, green and blue light sources. For example, intended uniform white areas of an image may exhibit colour variation and so may not appear uniformly white. Various effects of this nature occur in a real-world system and are broadly referred to herein as speckle or speckle-like even though it may be debatable by academics and the like whether the effects are truly examples of laser-speckle in accordance with the strict definitions accepted in the field. In other words, the term "speckle" is used broadly herein to refer to undesired optical effects that result in the appearance of a grainy or speckly image. The grain or speckle is considered "noise" in the image.

It is known to reduce speckle, or the perception of speckle, by moving the light receiving member/diffuser in holographic projectors that form a holographic reconstruction on such components. For example, the diffuser may be provided as a translating disc. In doing so, the region of the light receiving member that is illuminated with the holographic reconstruction changes over time, thereby changing the pattern of light of the holographic reconstruction that emanates from the light receiving member. This is because statistical imperfections in the light receiving member influence the pattern of speckle so that the pattern changes because a continuously changing set of imperfections is illuminated as the light receiving members moves. As the pattern of speckle changes over time, it is averaged/integrated by the optic system of a human observer, so that the appearance of speckle in the holographic reconstruction is reduced.

However, there are disadvantages to using a moveable light receiving member (e.g. translating disc diffuser) to reduce speckle. In particular, a holographic projector comprising such a moveable diffuser will be arranged to have good image quality in the holographic reconstruction at a single virtual image distance. But, at other distances, the image quality is significantly degraded. It would be desirable to be able to display virtual images at a plurality of arbitrary depths and to be able to display a plurality of virtual images, each at a different (arbitrary) depth, while also achieving good image quality. This is more complex with the "moveable light receiving member" example.

Furthermore, some holographic projectors do not comprise a light receiving member/diffuser. Instead, the holographic projector is configured such that light that is received by the viewer is spatially modulated in accordance with a hologram (not the picture). For example, a holographic reconstruction of the picture is formed by the lens of the eye performing a hologram-to-image transform. In other words, a holographic wavefront is received by the viewing system (eye) rather than an image wavefront. Such holographic projectors may be referred to as "hologram to eye" projectors. Hologram to eye projectors may suffer from at least the second source of speckle identified above. Speckle cannot be reduced by movement of a light receiving member in hologram to eye projectors given the total absence of a light receiving member.

The holographic projector and method of holographic projection according to the present disclosure advantageously reduce/minimises speckle (or the perception of a speckle-type effect) and are suitable for forming high quality virtual images at a plurality of (arbitrary) virtual depths. The holographic projector (and method) is particularly advantageous for reducing the second source of speckle (i.e. speckle/grain due to image pixel cross-talk) and doing so in a way that does not require a moving diffuser (and, in fact, does not require a diffuser at all and so is suitable for "hologram to eye" projectors). The absence of a diffuser means that the holographic projector according to the present disclosure may not suffer from the first source of speckle.

The holographic projector/projection method according to embodiments comprises an optical system comprising at least a first lens and optionally a second lens. The system is arranged to receive a holographic wavefront at the first lens. An (intermediate) holographic reconstruction of the picture encoded by the hologram is formed downstream of the first lens, optionally between the first and second lens. The wavefront is then received at the second lens (if present) to form a modified holographic wavefront. The holographic projector may be arranged such that the modified holographic wavefront is relayed to an eye-box. A viewing system at the eye-box may perceive a virtual image of the picture from the eye-box. Through experimentation and simulation the inventors have surprisingly found that rapidly moving a kinoform that is also disposed downstream of the first lens (between the first and second lens, if the second lens is present) significantly reduces/minimises the perception of speckle in the holographic reconstruction formed by the viewing system (e.g. eye) even though the introduction of time-varying phase-randomisation on the wavefront might be expected to upset the holographic reconstruction process performed by the viewing system particularly when the hologram is a phase, or even phase-only, hologram. In some embodiments, the kinoform is arranged to apply a different phase-delay to adjacent image pixels/points of light of an intermediate holographic reconstruction between two optical elements such as lenses. By rapidly moving the kinoform, the phase-delay applied to each image pixel/point of light of the intermediate holographic reconstruction is also rapidly changed which, in turn, changes the pattern of speckle. In particular, the pattern of speckle of the holographic reconstruction (perceived from the eye-box) rapidly changes. The kinoform is moved rapidly enough that a plurality of different phase-delays are applied to each image pixel/point of light of the intermediate holographic reconstruction within the integration time of a human eye. So, as the pattern of speckle changes over time, it is averaged by an optic system (for example, the eye of a human observer). Thus, the appearance/perception of speckle in the holographic reconstruction is reduced. The inventors have found that the rapidly changing phase-delay applied to each image pixel/point of light of a intermediate holographic reconstruction, described above, reduces/minimises the perception of speckle (in particular, speckle of the second source, due to high resolution images) without the loss of depth information of the virtual image and at any arbitrary depth/distance of virtual image.

In some embodiments, the processing of the hologram to remove speckle, in accordance with this disclosure, takes place within the optical system at a point that an (intermediate) holographic reconstruction of picture is formed. At this point, it is possible to process the individual pixels/points of light of the holographic reconstruction in order to modify the holographic reconstruction. The holographic reconstruction may be said to reform a holographic wavefront that the second lens relays towards the eye-box. The holographic projector/method of holographic projection may be described as processing the hologram/holographic wavefront (using the moving kinoform) to reduce/minimise speckle. The hologram that is output by the optical system is a processed or modified hologram relative to the hologram that is displayed on the display device/received by the optical system. The processing introduces an apparently (spatially and temporally) random and changing (i.e. time-varying) phase-delay to reduce/minimize the perception of speckle-like noise as described above.

In a first aspect there is provided a holographic projector. The holographic projector may be described as being a holographic projector for processing a hologram. The processing may be to reduce speckle-like noise in a holographic reconstruction of the hologram formed or projected by the holographic projector.

The holographic projector comprises a display device arranged to form a holographic wavefront by spatially modulating light in accordance with a hologram of a picture displayed thereon. The display device may be a pixelated display device. The display device may be a spatial light modulator such as a liquid crystal on silicon spatial light modulator. The spatial light modulator may be a pixelated spatial light modulator.

The holographic projector comprises an optical (e.g. magnification) system comprising a first lens. The first lens may be arranged to receive spatially modulated light from the display device. The first lens is arranged to form an intermediate holographic reconstruction of the picture by focusing the holographic wavefront towards/substantially at a focal plane of the first lens. Said focal plane of the first lens may be referred to as a first or front plane of the first lens. The intermediate holographic reconstruction of the picture comprises a plurality of pixels or points of light. The holographic projector further comprises a kinoform disposed downstream of the first lens. The kinoform is arranged to apply a phase-delay to each pixel of the intermediate holographic reconstruction such that the phase-delay applied to each pixel is different to the phase-delay of the (immediately) adjacent or connecting. The holographic projector further comprises a movement assembly arranged to move the kinoform such that a plurality of different phase-delays are applied to each pixel of the holographic reconstruction within the integration time of the human eye.

As described above, the advantage of providing a movement assembly arranged to move a kinoform (arranged to apply a phase-delay to the pixels of the holographic reconstruction such that a different phase-delay is applied to adjacent to pixels) is to reduce/minimize a speckle effect (or at least the perception of speckle effect). The kinoform (in a first position) is arranged to apply a phase-delay to each image spot or pixel of the (intermediate) holographic reconstruction such that the phase-delay applied to each image pixel is different to the phase-delay of the (immediately) adjacent or connecting. As above, adjacent pixels/points of light interact/interfere with each other to form the speckle pattern. By applying different phase delays to adjacent pixels/points of light of the holographic reconstruction, the interaction/interference is changed and so the speckle pattern is changed. By moving the kinoform (in particular, moving the kinoform with respect to the first lens/the holographic reconstruction), different pixels of the holographic reconstruction interact with different portions of the kinoform and so experience different phase-delays. Importantly, the relative phase-delay between adjacent pixels/points of light of the (intermediate) holographic reconstruction changes as the kinoform is moved. Each time the relative phase-delay changes, the speckle pattern changes. The kinoform is moved rapidly enough that a plurality of different phase-delays are applied to each pixel of the intermediate hologram reconstruction within the integration time of the human eye. So a plurality of different speckle patterns are received by a human observer. The (continuously changing) speckle pattern, is averaged by the optic system of a human observer, so that the appearance of speckle in the holographic reconstruction is reduced/minimised.

In some embodiments, the magnification system comprises a second lens. The kinoform may be disposed between the first lens and the second lens of the optical (e.g. magnification) system. The second lens may comprise a back focal plane downstream of the first lens. The second lens may be arranged to receive light of the (intermediate) holographic reconstruction (after it has been modified by the kinoform) such that it may be said that the second lens receives a (modified) holographic wavefront. The holographic wavefront is modified/processed relative to the holographic wavefront received by the first lens (as a result of the interaction with the kinoform). The second lens may output the holographic wavefront with magnification or demagnification.

The first lens and second lens may be arranged to form a magnifying or demagnifying telescope. In some embodiments, the front focal plane of the first lens is substantially aligned/coplanar with the back focal plane of the second lens. The first lens may have a first focal length. The second lens may have a second focal length. A separation between the first lens and the second lens may be substantially equal to the sum of the first and second focal lengths. The first lens may comprise a first optical axis. The second lens may comprise a second optical axis. In some embodiments, the first optical axis may be aligned and/or parallel and/or colinear with the second optical axis. In such embodiments, the separation between the pair of lenses may be a separation/distance (measured) parallel to the first and/or second optical axis. In some embodiments, the first optical axis may be angled with respect to the second optical axis. For example, the angle between the first optical axis and the second optical axis may be between 70 and 110 degrees, optionally substantially 90 degrees. In some embodiments, the magnification system may be referred to as a 4f system.

The first lens and/or the second lens may both be converging lenses. As used herein, the focal length of the first and/or second lens is the distance from the centre of the respective lens to the principal foci of the lens. Collimated light will be focused at this single point by the first/second lens (as a converging lens). This assumes that the first and/or second lenses (respectively) are thin lenses in air. As used herein, the focal plane of a lens (e.g. the first or second lens) is a plane that is perpendicular to the optical axis of the lens. The distance from the centre of the respective lens to the focal plane is equal to the focal length.

In some embodiments, the holographic projector further comprises a waveguide which may be referred to as a waveguide pupil expander or pupil replicator or hologram replicator. The waveguide may comprise a pair of opposing surfaces which may be arranged to waveguide light therebetween. The light that the waveguide is arranged to waveguide may be received directly or indirectly from the second lens. A first surface of the pair of opposing surfaces may be partially-reflective partially-transmissive such that a plurality of replicas of the (modified/despeckled) holographic wavefront are emitted therefrom. A particular embodiment of a holographic projector comprising a waveguide may be a "hologram to eye" type projector. In such embodiments, the aperture/pupil of a display device may limit the size of a viewing window (e.g. eye-box). The waveguide may be used to form an expanded (increased size) viewing window by creating and emitting a plurality of replicas of the pupil. Each waveguide generates a plurality of replicas of a holographic wavefront formed by illuminating a hologram displayed on the display device.

As used herein, an intermediate holographic reconstruction is a holographic reconstruction formed downstream of the first lens, in particular a holographic reconstruction formed by/within the optical/magnification system. This intermediate holographic reconstruction is a reconstruction of the picture of the hologram and is a different holographic reconstruction to that which may be perceived by a user (for example, formed by a viewing system such as by a lens of a human viewer in a hologram to eye type projector), although both holographic reconstructions are reconstructions of the picture of the hologram. For example, the amount of noise or signal-to-noise ratio of the two instances of the holographic reconstruction may be different.

As described above, the first lens is arranged to form an intermediate holographic reconstruction of the picture (encoded in the holographic wavefront) toward (e.g. substantially at) the front/first focal plane of the first lens. There is effectively a modified holographic wavefront received by the second lens which is then relayed to an eye-box. A viewing system at the eye-box perceives a virtual image at (at least) a first virtual image distance. In some embodiments, the holographic projector is arranged such that a first virtual image is viewable from the eye-box at a first virtual image distance and a second virtual image is viewable from the eye-box at a second virtual image distance that is different to the first. In some embodiments, the holographic projector may be arranged so that the virtual images are formed at a range of between about 1 meter to about 30 meters. For example, in the some embodiments, the holographic projector may be part of a head-up display for a vehicle. In such cases, it may be desirable for an occupant of the vehicle to view images that appear closer (e.g. a couple of meters away) and images that appear further way (e.g. 20 meters away or more). The virtual images at a shorter virtual image distance may relate to driver information, for example vehicle information such as speed, distance, fuel level. The virtual images at a further virtual image distance may be, for example, directional information.

There may be a first plane at a first distance from the first lens where (at least a first portion) of the intermediate holographic reconstruction is in focus. Moving away from this first plane, the first portion of the holographic reconstruction will become defocused. As will be well understood by the skilled person, the exact position where the (intermediate) holographic reconstruction is in focus between the first and second lens may depend on the corresponding virtual image distance of the virtual image. For example, if the holographic projector is arranged to form a virtual image with a virtual image distance at infinity, then the holographic reconstruction will be in focus at the front/first focal plane of the first lens. However, for shorter virtual image distances, the focal plane of the intermediate holographic reconstruction may be shifted further away from the first lens. The amount of shift will depend on the specific optical arrangement (for example, on the optical power of the first lens) and the range of image depths. The inventors have found that the amount of shift in the position the intermediate holographic reconstruction is in focus may be equal to about 2 to 5 percent of the focal length of the first lens if the image distance of the holographic reconstruction is changed from 1.5 meters to 10 meters. In some embodiments, the shift in the holographic reconstructions over such a range of virtual image distances may be only a couple of millimeters. Thus, if the holographic projector is arranged to form first and second virtual images at respective first and second virtual image depths (as described in the preceding paragraph), then a first portion of the holographic reconstruction associated with the first virtual image may be in focus at a first plane which is a first distance from the first lens and a second portion of the holographic reconstruction associated with the second virtual image may be in focus at a second plane which is a second distance from the first lens.

The inventors have found that the despeckling effect of the kinoform is maximized/optimized when the kinoform is disposed exactly at a plane of the holographic reconstruction. So, for example, for a holographic reconstruction for a virtual image at infinity, the kinoform would be positioned exactly at the first/front focal plane of the first lens for maximum despeckling (because the holographic reconstruction is at infinity). However, the inventors have also found that the despeckling effect of the kinoform is good even if the kinoform is not positioned exactly at the holographic reconstruction. For example, through simulation and experimentation, the inventors have found that a kinoform positioned at the first/front focal plane (i.e. the most preferable position when the virtual image distance is at infinity) the speckling effect is still significantly reduced for holographic reconstructions having an image distance as short as 1.5 meters (for example). This means that the kinoform may be positioned exactly at the front focal plane of the first lens and provide good de-speckle for virtual images formed at a range of different arbitrary virtual distances and when virtual images are formed at a plurality of different arbitrary virtual distances.

In some embodiments, the kinoform may disposed at an intermediate plane or intermediate position. The distance from the first lens to the intermediate plane may be greater than the distance from the first lens to the front focal plane of the first lens. As above, the holographic projector may be arranged to form a first virtual image at a first virtual distance and a second virtual image at a second virtual distance. A first portion of the holographic reconstruction associated with the first virtual image may be in (complete) focus at a first distance from the first lens. A second portion of the holographic reconstruction associated with the second virtual image intermediate plane may be in (complete) focus at a second distance from the first lens. The distance from the first lens to the intermediate plane may be greater than the first distance. The distance from the first lens to the intermediate plane may be less than the second distance. In other words, the intermediate plane (or intermediate position) may be between the holographic reconstruction associated with the first virtual image and the holographic reconstruction associated with the second virtual image. The intermediate plane (or intermediate position) may be at a midpoint between the holographic reconstruction associated with the first virtual image and the holographic reconstruction associated with the second virtual image. In other words, the kinoform may be positioned at said midpoint. The inventors have found that the advantage of positioning the kinoform at said midpoint is that the efficiency of speckle reduction is maximized for all image distances. In some embodiments, the kinoform may be disposed between the first and second lens such that a distance between the (front) focal plane of the first lens and the kinoform is 5 millimeters or less, optionally 3 millimeters or less. A distance between the focal plane of the first lens and the kinoform is optionally 0.5 millimeters or more, optionally 1 millimeter or more. In other words, the above described midpoint may be at this distance from the front focal plane of the first lens.

In some embodiments, the kinoform may be described as being substantially disposed at the (front) focal plane of the first lens. This definition includes the kinoform being disposed exactly at the (front) focal plane of the first lens as well as the kinoform being disposed at a distance from the first lens equal to the distance to the (front) focal plane plus or minus 5 millimeters, optionally plus or minus 3 millimeters. In other words, this definition includes the kinoform being disposed at the "midpoint" described in the preceding paragraph.

In some embodiments, the movement assembly is arranged to move the kinoform such that the kinoform has a first position with respect to the (intermediate) holographic reconstruction and a second position with respect to the (intermediate) holographic reconstruction. The first position may be different to the second position. The movement assembly may be arranged to repeatedly move the kinoform between the first position and the second position. The movement assembly may be arranged to move the kinoform between the first position and the second position at a frequency of 100 Hz or greater, optionally 500 Hz or greater, optionally 1 kHz or greater. Such ranges of frequencies may advantageously be suitably high that a large number of different phase-delays are applied to the intermediate holographic reconstruction, in particular may be high enough that a plurality of different phase-delays are applied to the intermediate holographic reconstruction within the integration time of a viewing system at an eye-box of the holographic projector (e.g. the integration time of the human eye).

In some embodiments, the movement assembly is arranged to move the kinoform rotationally and/or translationally between the first position and the second position. The distance between the first position and the second position of the kinoform may be equal to the distance between a first image pixel and a second image pixel of the holographic reconstruction. The first pixel and second pixel may be separated by at least three other pixels, optionally at least six other pixels, optionally at least eight other pixels. Thus, in moving the kinoform from the first position to the second position, each pixel of the intermediate holographic reconstruction may experience a plurality of different phase-delays. For example, if the first and second pixel are separated by three pixels, each pixel of the holographic reconstruction may experience at least 5 phase-delay changes when the kinoform is formed from the first position to the second position.

The kinoform may be substantially planar. A first plane may be defined by the substantially planar kinoform. Light of the intermediate holographic reconstruction may propagate towards the kinoform substantially in a first direction. A normal of the first plane may be substantially parallel to the first direction. The movement assembly may be arranged to move the kinoform (rotationally or translationally) within the first plane.

As used herein, a kinoform is a device that operates only on the phase of an incident wave. The kinoform may comprise a computer-generated pattern to operate on the phase of the incident wave. The computer-generated pattern may be fixed/permanently recorded in the kinoform. For example, in some embodiments, the kinoform may comprise a transmissive material having a refractive index greater than 1 and may operate on the phase of an incident wave based on a changing thickness of that transmissive material. In some embodiments, the kinoform may be (or may be described as) a diffractive optical element.

In some embodiments, the kinoform is arranged to apply a phase-delay to each pixel of the holographic reconstruction of between 0 and pi radians. In some embodiments, the spatially modulated light comprises light of a plurality of different wavelengths. The kinoform may be arranged to apply a phase-delay to each pixel of the holographic reconstruction of between 0 and pi radians for the longest wavelength. The kinoform may be arranged to apply a phase-delay to one or more of the pixels of the holographic reconstruction that is greater than pi radians for a wavelength of the spatially modulated light that is shorter than the longest wavelength.

In some embodiments, the kinoform may comprise an array of (discrete/contiguous) zones/portions/regions. Each zone/portion/region may be arranged to apply a different phase-delay to incident light to the phase-delay applied by an adjacent zone/portion/region. The kinoform may be arranged such that the width or the height of an area occupied by each zone/portion/region on the kinoform is substantially equal to the distance between adjacent pixels of the holographic reconstruction. The inventors have found that such an arrangement is advantageous. In particular, the inventors have found that it may be advantageous to reduce the number of different phase delays that are simultaneously applied to a particular pixel of the holographic reconstruction. The inventors have found that the more different phase delays that are applied to each pixel simultaneously of the holographic reconstruction, the worse the quality of holographic reconstruction becomes. For example, the coherence of the holographic reconstruction may be broken down. The inventors have found that this may result in the three-dimensional effect of a holographic reconstruction (when viewed from a viewing window) may be reduced or lost when the number of different phase delays simultaneously applied to each pixel increases beyond a threshold. So, the inventors have found that it may be particularly desirable in three-dimensional holographic reconstructions (where the pixels of the reconstruction occupy a three-dimensional volume in space) to provide a kinoform arranged such that the width or the height of an area occupied by each zone/portion/region on the kinoform is substantially equal to the distance between adjacent pixels of the holographic reconstruction. Of course, even in such embodiments, it is inevitable that more than one phase delay will be simultaneously applied to each pixel as the kinoform is moved (in at least some positions of the kinoform). But the inventors have found that providing a kinoform arranged such that the width or the height of an area occupied by each zone/portion/region on the kinoform is substantially equal to the distance between adjacent pixels of the holographic reconstruction may minimize this.

As described above, the movement assembly may be arranged to move the kinoform such that the kinoform has a first position with respect to the holographic reconstruction and a second position with respect to the holographic reconstruction. In the first position, each respective pixel of the holographic reconstruction may be aligned with a respective zone/portion/region of the kinoform. This may be such that each individual pixel is associated/aligned with a unique zone/portion region. In other words, at most one pixel or light point of the intermediate holographic reconstruction may be associated with each zone/portion/region of the kinoform in the first position. In the second position, each pixel of the holographic reconstruction may be aligned with a different zone/portion/region of the kinoform to zone/portion/region that the respective pixel is aligned with in the first position of the kinoform.

In some embodiments, there is a one to one ratio between the number of zones/portions/regions of the kinoform and the number of pixels/points of light of the holographic reconstruction. In other embodiments, there may be more zones/portions/regions of the kinoform than there are pixels/points of light in the holographic reconstruction. This may be to compensate for the fact that the kinoform is moved with respect to the intermediate holographic reconstruction. The kinoform may be arranged such that each pixel/point of light of the intermediate holographic reconstruction is associated with a zone/portion/region of the kinoform in all positions of the kinoform (including the intermediate positions between the first and second position described above). This may require there to be more zone/portions/regions than there are pixels/points of light, particularly if the kinoform is moved translationally with respect to the holographic reconstruction.

Each zone/portion/region of the kinoform may be arranged to apply a phase-delay having one of a plurality of (different) allowable or discrete values. The number of allowable (or discrete) values may be less than the number of pixels/points of light of the intermediate holographic reconstruction such that the same phase-delay is applied to multiple pixels of the holographic reconstruction (although these pixels/zones are not adjacent to one another). For example, the skilled person will appreciate that only two different allowable values for the phase-delay are needed in order for the kinoform to achieve a phase-delay being applied to each pixel with each pixel having a different phase-delay to adjacent pixels (for example, the kinoform could have a chequerboard structure in which zones arranged to apply a first phase-delay are alternated with zone arranged to apply a second phase-delay that is different to the first phase delay). A kinoform having a relatively lower number of allowable values for the phase-delay is simpler and cheaper to manufacture but a kinoform having a relatively higher number of allowable values for the phase-delay may provide an improved despeckling effect. The inventors have found that a good compromise between despeckling ability and manufacturing complexity is if the number of allowable values of phase delay consist of four or more (different) allowable values and/or consists of twelve or fewer (different) allowable values, optionally ten or fewer (different) allowable values.

The thickness of the kinoform within each zone/portion/ regions may be constant. In other words, the zones/portions/ regions of the kinoform may be defined by areas of constant/ consistent thickness. However, the thickness of adjacent zones/portions/regions of the kinoform may be different. The amount of phase delay may be related to the thickness of the kinoform. So, the thickness of the zones may correspond to the phase-delay patterns described above. For example, each zone/portion/region of the kinoform may have a thickness having one of a plurality of allowable values. The number of allowable values of thickness may be equal to the number of allowable values of phase-delay described above. The plurality of allowable values of thickness may consist of four or more allowable values. The plurality of allowable values of thickness may consist of twelve or fewer allowable values, optionally ten or fewer allowable values.

In some embodiments, the kinoform may comprise a material having a refractive index that is greater than 1. The refractive index of the kinoform may be greater than the refractive index of air. Thus, light may propagate more slowly through the kinoform than through air. A phase-delay can therefore be achieved by providing a kinoform having different thicknesses in different zones/regions/areas. The phase-delay will be greater in zones/regions/areas of greater thickness.

The kinoform may comprise a substantially transparent material. In some embodiments, the kinoform comprises glass or quartz. In some embodiments, the kinoform is arranged transmit light of the holographic reconstruction. In such embodiments, the kinoform may be positioned directly between the first and second lens such that the optical axis of the first and second lenses are parallel. In other embodiments, the kinoform may be arranged to reflect light. For example, the kinoform may comprise a first layer of a transparent material such as glass/quartz (as above) and a second layer of reflective material such as silver or aluminum which may be a coating on the transparent material layer. The transparent material layer may be arranged to apply the phase-delay and the reflective layer may be arranged to reflect light back through the transparent material layer (such that a wavefront is propagated through the transparent material layer twice). In such embodiments, the optical axis of the first lens and/or second lens may be angled with respect to a normal of the first plane defined by the planar kinoform (for example, at 45 degrees). Similarly, the optical axis of the first lens may be angled with respect to the optical axis of the second lens (for example, at 90 degrees). In some embodiments, the kinoform may be displayed on a second spatial light modulator such as a liquid crystal on silicon spatial light modulator (which is not the same display device of the projector arranged to display the hologram, mentioned above).

In some embodiments, the kinoform may be substantially non-diffuse. In other words, the kinoform may be arranged such that a propagation angle, or range of propagation angle, of light propagating therefore is substantially unchanged by the kinoform. Thus, collimated light incident on the kinoform may remain substantially collimated. Diverging light incident on the kinoform may remain divergent at substantially the same angle.

As described above, the holographic projector may be arranged to relay the spatially modulated light from the second lens such that a virtual image comprising the picture/ picture content encoded in the hologram is viewable from an eye-box. In some embodiments, the holographic projector is arranged to relay the spatially modulated light from the second lens such that a first virtual image and a second virtual image is viewable from the eye-box, wherein the first virtual image appears at a different distance to the second virtual image. As described previously, one of the advantages of the despeckle approach of the present disclosure (achieved using the moveable kinoform) is that the holographic projector may project a plurality of virtual images at a plurality of arbitrary virtual image depths without degradation of the image outside of a particular depth range. This was not possible in prior art arrangements (for example comprising the moveable light receiving surface referred to above). In some embodiments, the difference in the distance of the first virtual image and the second virtual image is 10 meters or greater, optionally 20 meters or greater.

In a second aspect, there is provided a method of holographic projection. In some embodiments, the method comprises processing the hologram to be projected.

The method of the second aspect comprises the step of displaying a hologram of a picture. This step may comprise displaying the hologram on a display device comprising a plurality of pixels. The method further comprises spatially modulating light in accordance with the hologram to form the holographic wavefront. For example, this step may comprise illuminating the display device with a light source such as a coherent light source such as a laser. The method further comprises the step of forming an (intermediate) holographic reconstruction of the picture by focusing the holographic wavefront towards a (front) focal plane using a first lens. The holographic reconstruction of the picture comprises a plurality of pixels. The method further comprises applying a phase-delay to each pixel of the holographic reconstruction using a kinoform downstream of the first lens. The phase-delay applied to each pixel may be different to the phase-delay of the immediately adjacent or connecting pixels. The method further comprises moving the kinoform such that each pixel of the holographic reconstruction has a plurality of different phase-delays applied thereto within the integration time of the human eye. As described in relation to the first aspect, this has the effect of reducing/minimizing the perception of speckle.

In some embodiments, the method further comprises receiving the (modified) holographic wavefront from the kinoform using a second lens, wherein the first lens and second lens collectively form a hologram magnification system. In some embodiments, the kinoform disposed between the first lens and the second lens.

In some embodiments, the method further comprises coupling the (modified) wavefront into a waveguide having a pair of opposing surfaces arranged to waveguide therebetween, wherein a first surface of the pair of opposing surfaces is partially-reflective partially-transmissive such that a plurality of replicas of the [modified] holographic wavefront are emitted therefrom.

In some embodiments, the step of moving the kinoform comprising moving the kinoform between a first position and a second position with respect to the holographic reconstruction. The first position may be different to the second position. The step of moving the kinoform may comprise repeatedly moving the kinoform between the first and second position. The step of moving the kinoform may comprise moving the kinoform between the first position and the second position at a frequency of 100 Hz or greater, optionally 500 Hz or greater, optionally 1 kHz or greater. Such ranges of frequencies may advantageously be suitably high that a large number of different phase-delays are applied to the intermediate holographic reconstruction, in particular may be high enough that a plurality of different phase-delays are applied to the intermediate holographic reconstruction within the integration time of a viewing system at an eye-box of the holographic projector (e.g. the integration time of the human eye).

The step of moving the kinoform may comprise moving the kinoform rotationally and/or translationally between the first position and the second position. The step of moving the kinoform may comprise moving the kinoform in a first plane. The kinoform may be substantially planar. The plane of the kinoform may be parallel to first plane/define the first plane.

The step of applying a phase-delay to each pixel of the holographic reconstruction may comprise applying a phase-delay to each pixel of between 0 and pi radians. In some embodiments, the spatially modulated light comprises light of a plurality of different wavelengths. The kinoform may be arranged to apply a phase-delay to each pixel of the holographic reconstruction of between 0 and pi radians for the longest wavelength. In some embodiments, the step of applying a phase-delay to each pixel of the holographic reconstruction comprises applying a phase-delay having one of a plurality of (different) allowable or discrete values. The number of allowable (or discrete) values may be less than the number of pixels/points of light of the intermediate holographic reconstruction such that the same phase-delay is applied to multiple pixels of the holographic reconstruction (although these pixels are not adjacent to one another). The inventors have found that a good compromise between despeckling ability and manufacturing complexity of kinoform is if the number of allowable values of phase delay consist of four or more (different) allowable values and/or consists of twelve or fewer (different) allowable values, optionally ten or fewer (different) allowable values.

Feature and advantages described in relation to the first aspect may apply to the method of the second aspect, and vice versa.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 20) which represents the amount of phase retardation provided by that pixel. For example, a pixel of the spatial light modulator described as having a phase value of 000 will retard the phase of received light by 000 radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 5B shows a perspective view of a first example two-dimensional pupil expander comprising two replicators each in the form of a solid waveguide;

FIG. 6A shows an idealised view of a portion of image pixels of a first image in the form of a uniform array of pixels, the idealised view being absent of interference effects between pixels;

FIG. 6C shows the portion of the first image of FIG. 6A in reality (including interference effects between pixels);

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
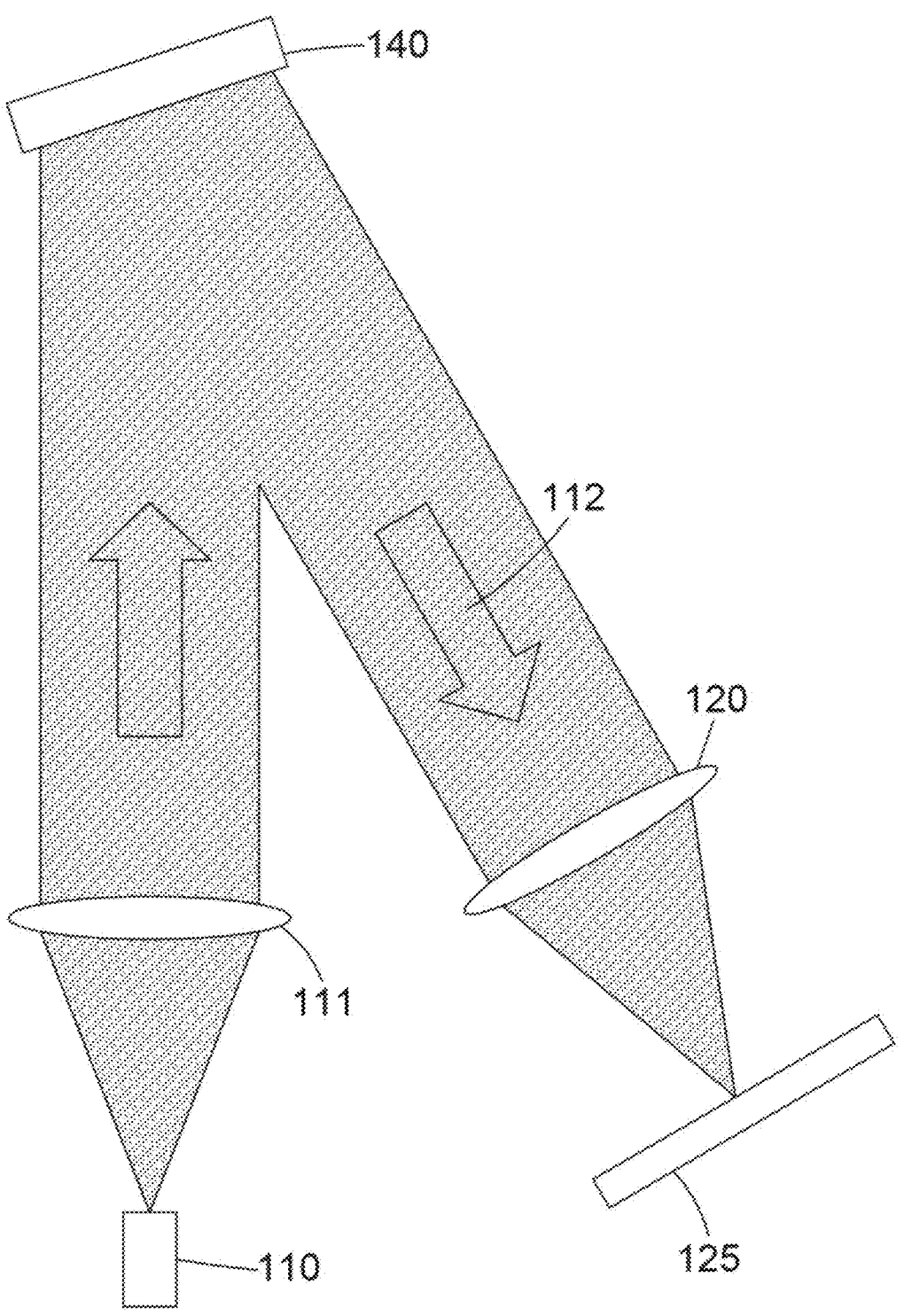
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 (published as GB2614286A) and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Eye-Box Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/ image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.) In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
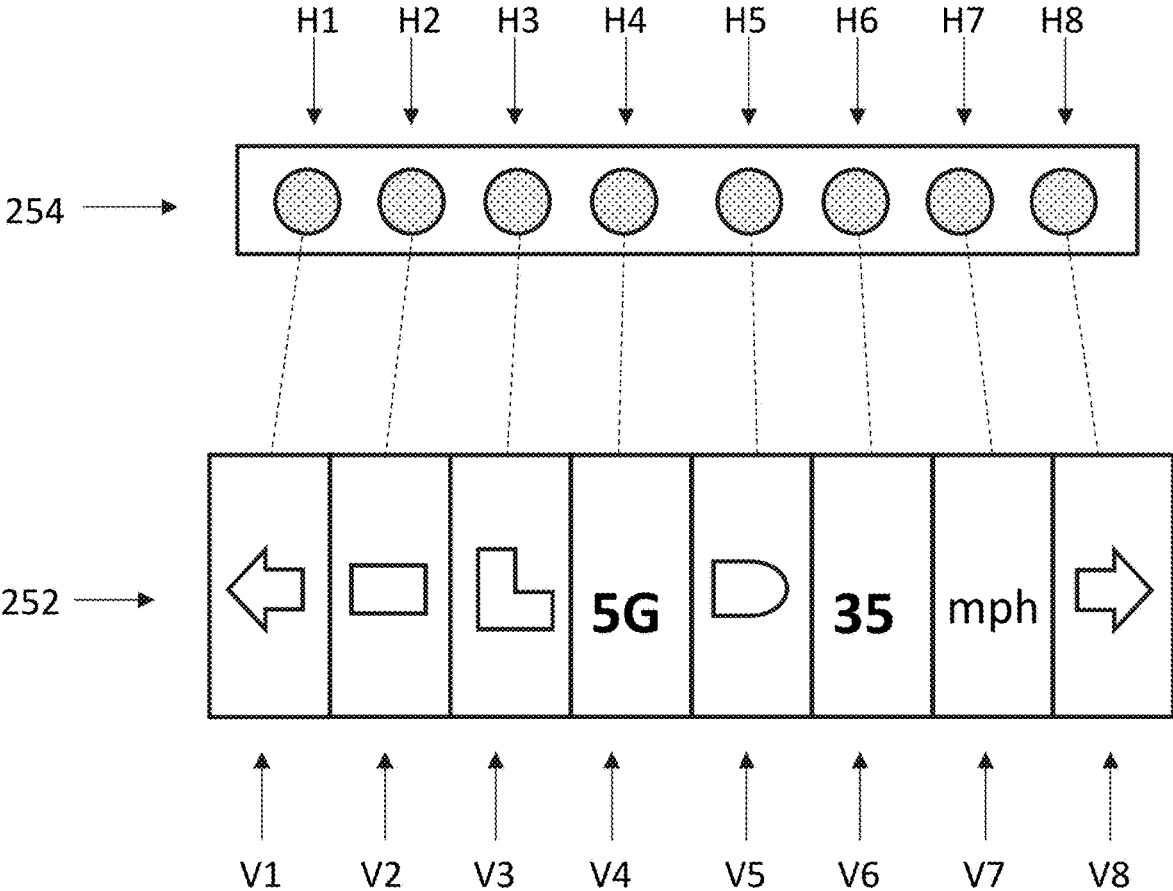
FIG. 2 shows an image for projection comprising eight image areas/components, V1 to V8, and cross-sections of the corresponding hologram channels, H1-H8.
Figure 3:
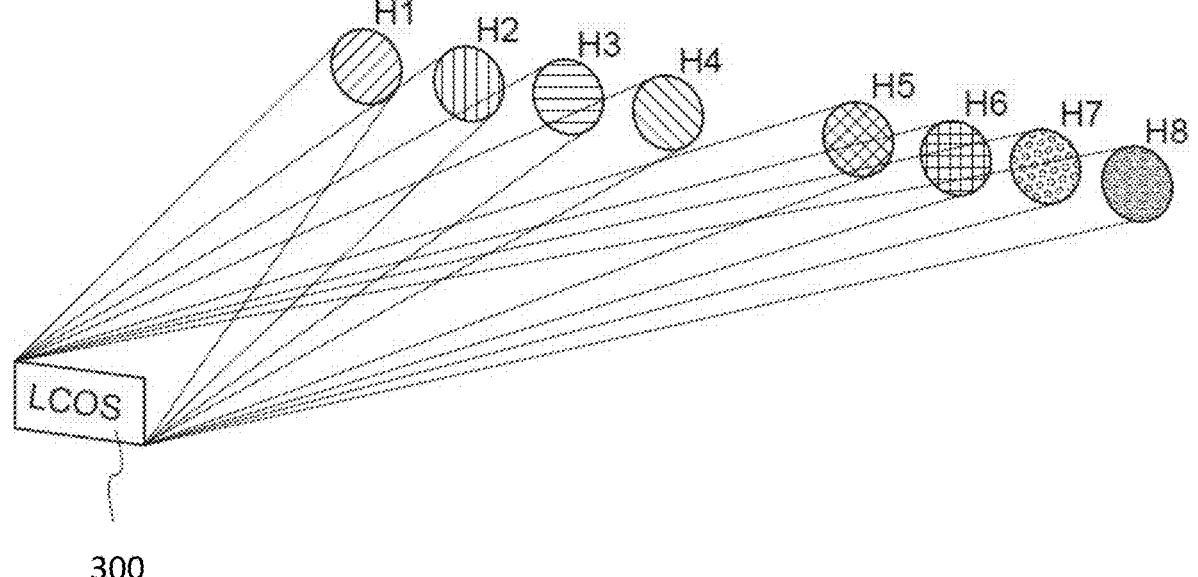
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram, displayed on LCOS 300 in this example, directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
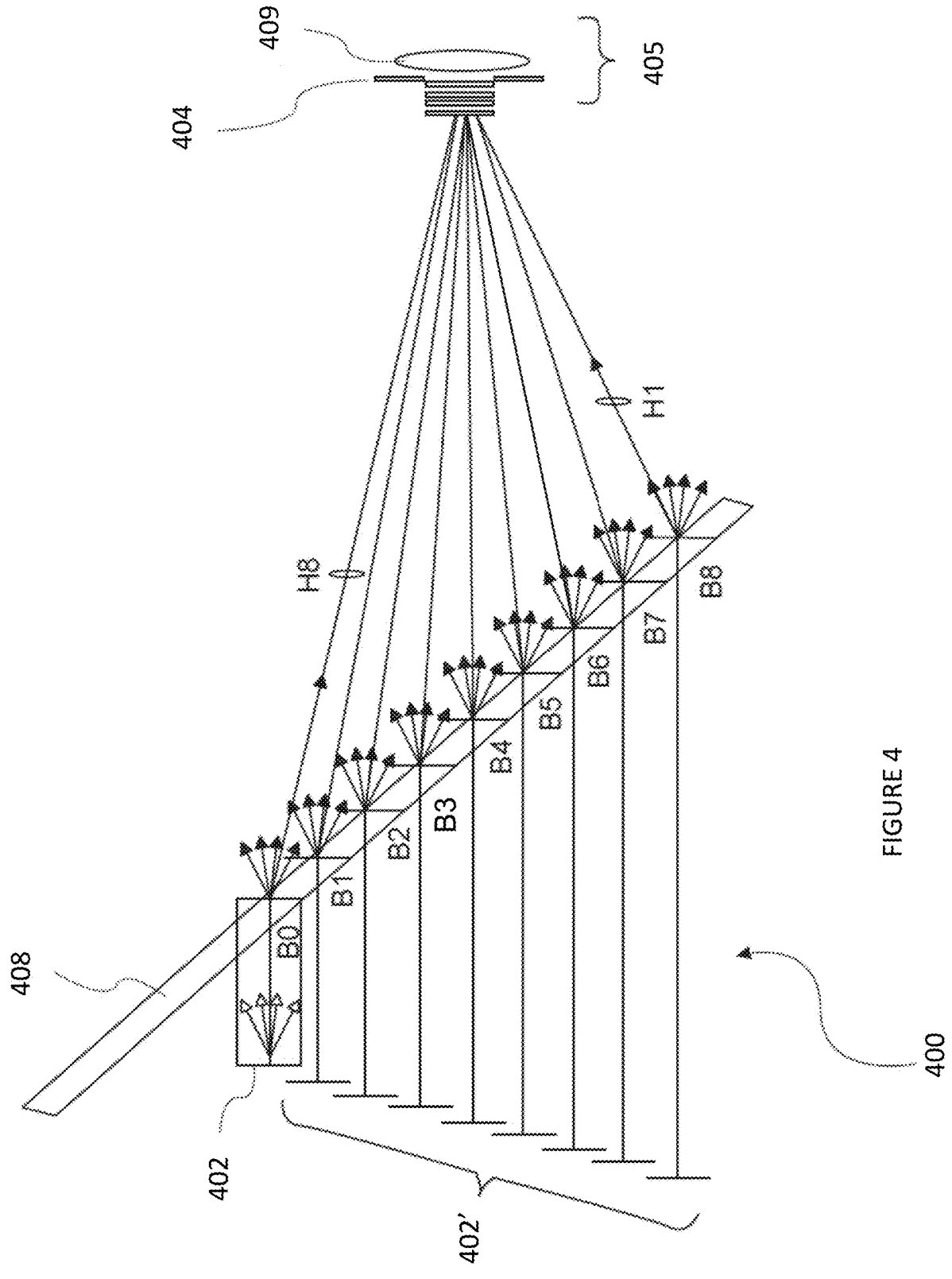
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
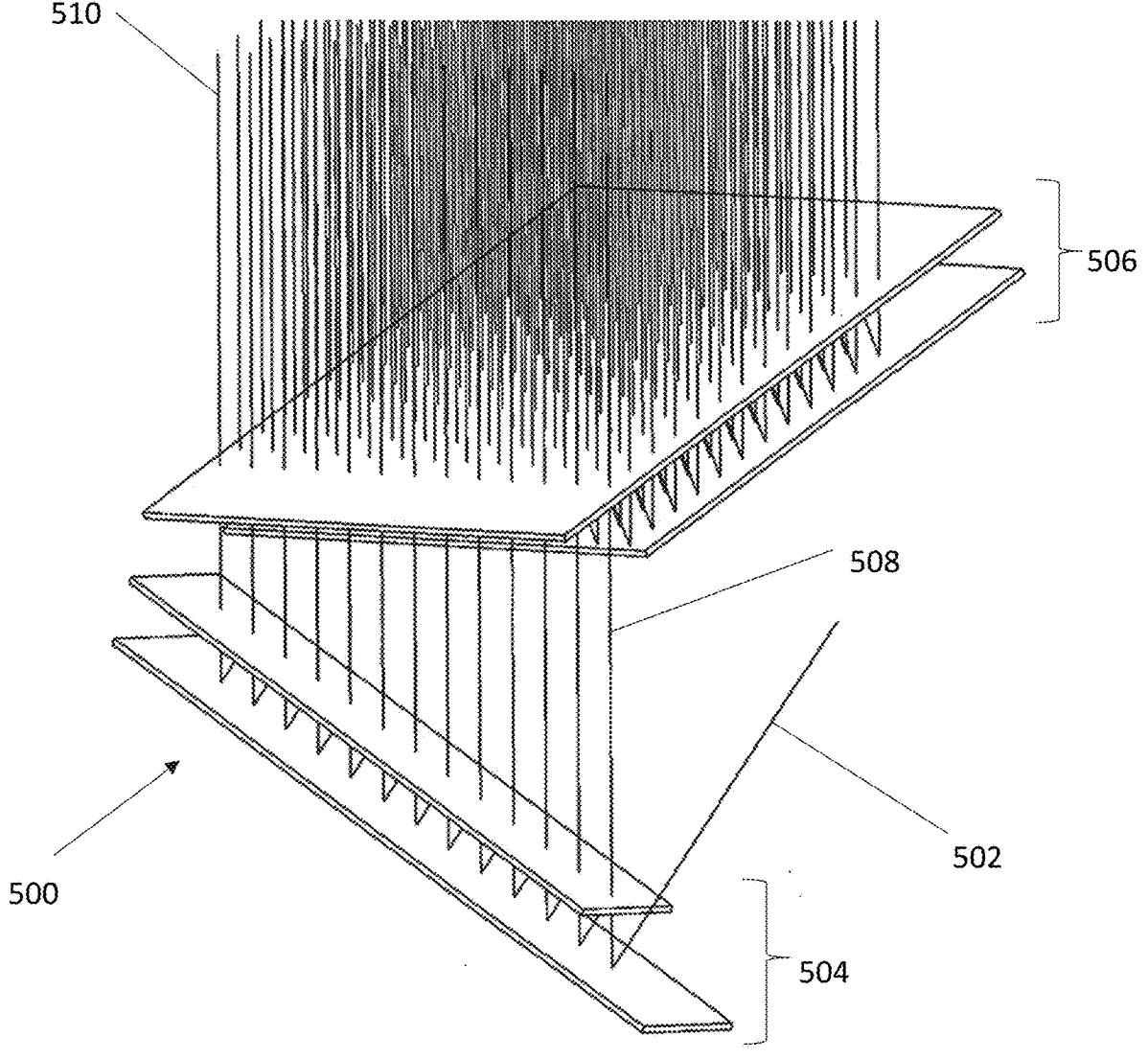
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
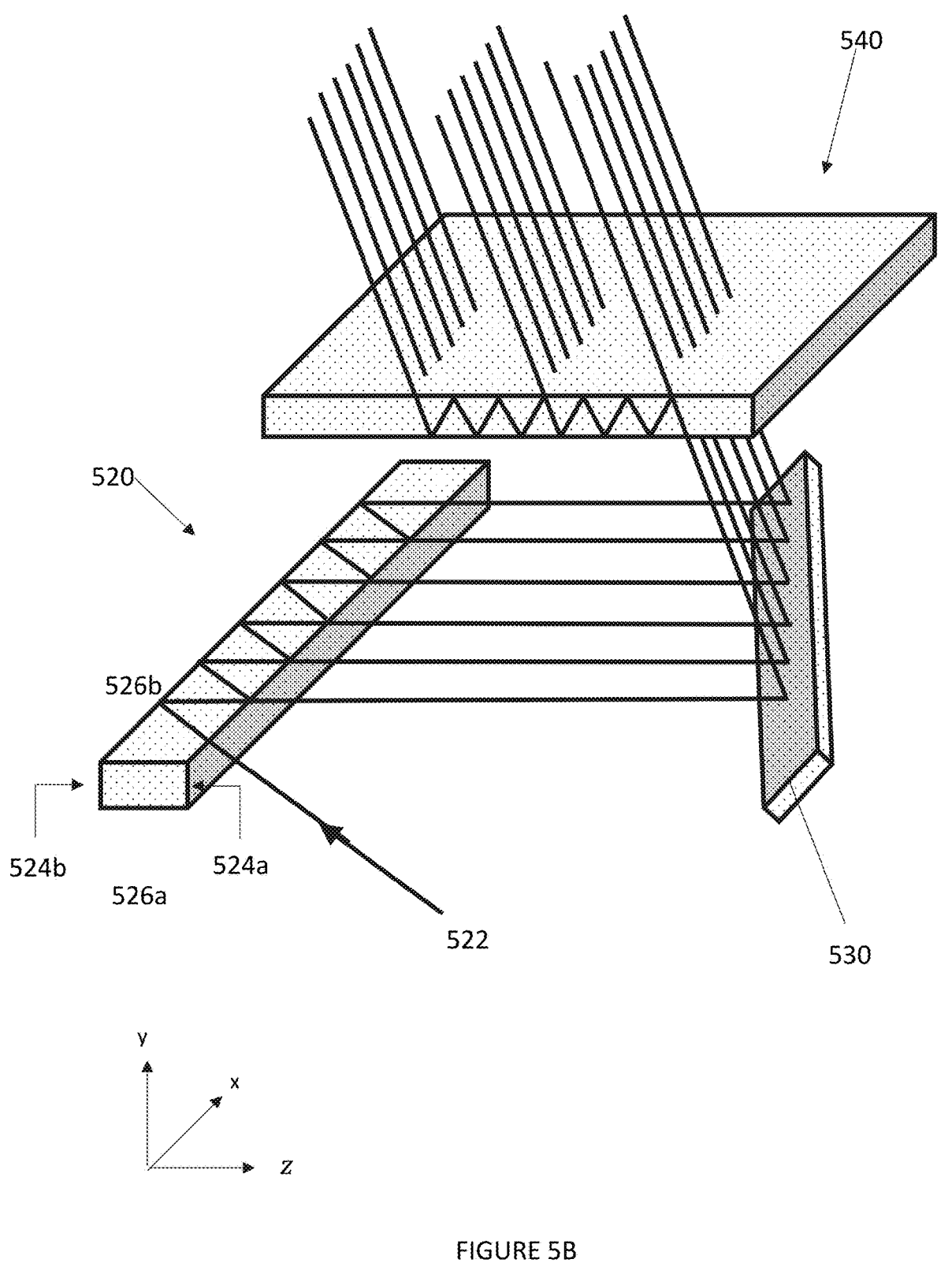

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide wave-guiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Speckle in High-Resolution Images

It has been described how a (holographic) projector is arranged to relay light from a display device (SLM) to a viewing system (such as a the eye of a user) at an eye-box. The lens of the eye performs a hologram-to-image transformation such that the viewer receives an image. This image is pixelated. That is, the holographic reconstruction comprises image spots or pixels. It is generally desirable for the image to have a high enough resolution so that the user cannot perceive the individual pixels. While such a resolution may be high enough to remove the perception of the individual pixels, another problem is introduced. In particular, light associated with adjacent (close together) pixels will interact (interfere) creating a pattern of dark and light areas which degrades the quality of the image. Throughout this disclosure, this effect is referred to as speckle. This is described in more detail below.

FIGS. 6A to 6D show how the speckle effect increases as the resolution of an image increases. For simplicity, amplitude information is omitted from each of FIGS. 6A to 6D.

Figure 6B:
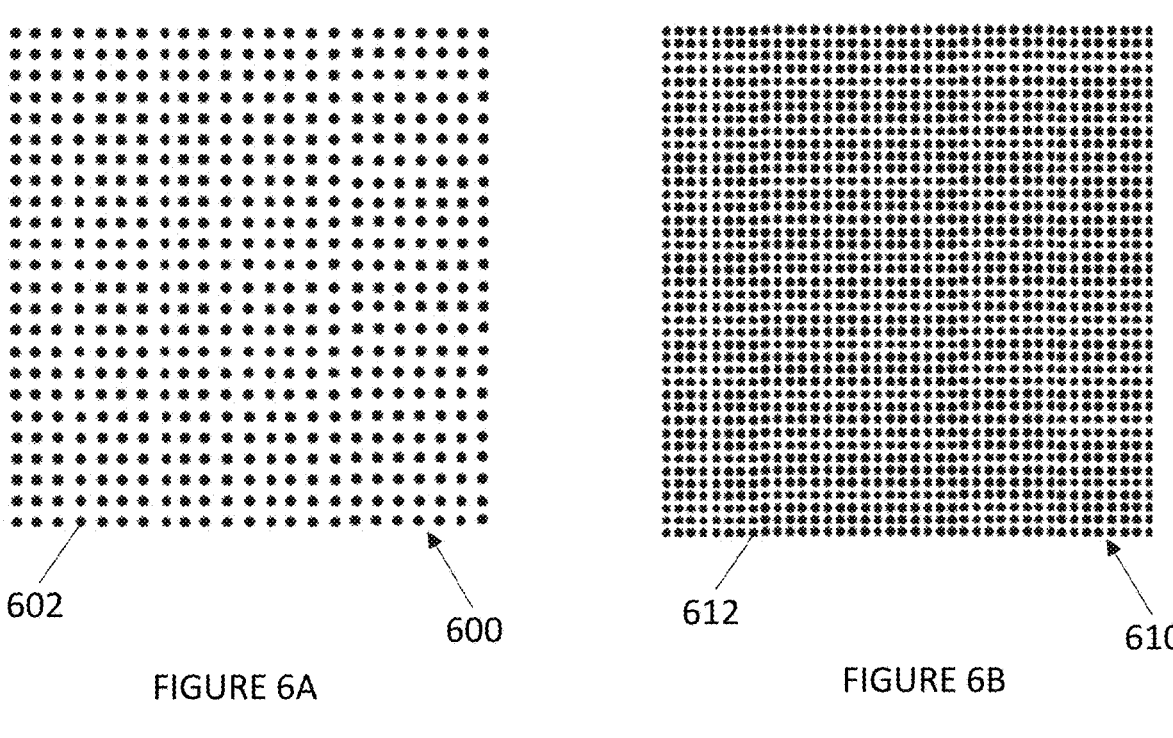
FIG. 6B shows an idealised view of a portion of image pixels of a second image in the form of a uniform array of pixels, the spacing between the pixels of the second image being less than the spacing between the pixels of the first image, and the idealised view being absent of interference effects between pixels.

FIGS. 6A and 6B represent how the pixels of a portion of an image (or holographic reconstruction) would ideally appear in the absence of speckle (specifically, in the absence of interference effect between pixels). FIG. 6A corresponds to a portion 600 of a first image having a relatively low resolution. FIG. 6B show a portion 610 of a second image having a relatively high resolution. Thus, the individual pixels 602 of FIG. 6A are further apart than the individual pixels 612 of FIG. 6B. In the idealised case of FIGS. 6A and 6B, the image pixels of both the first and second images form a uniform array.

Figure 6D:
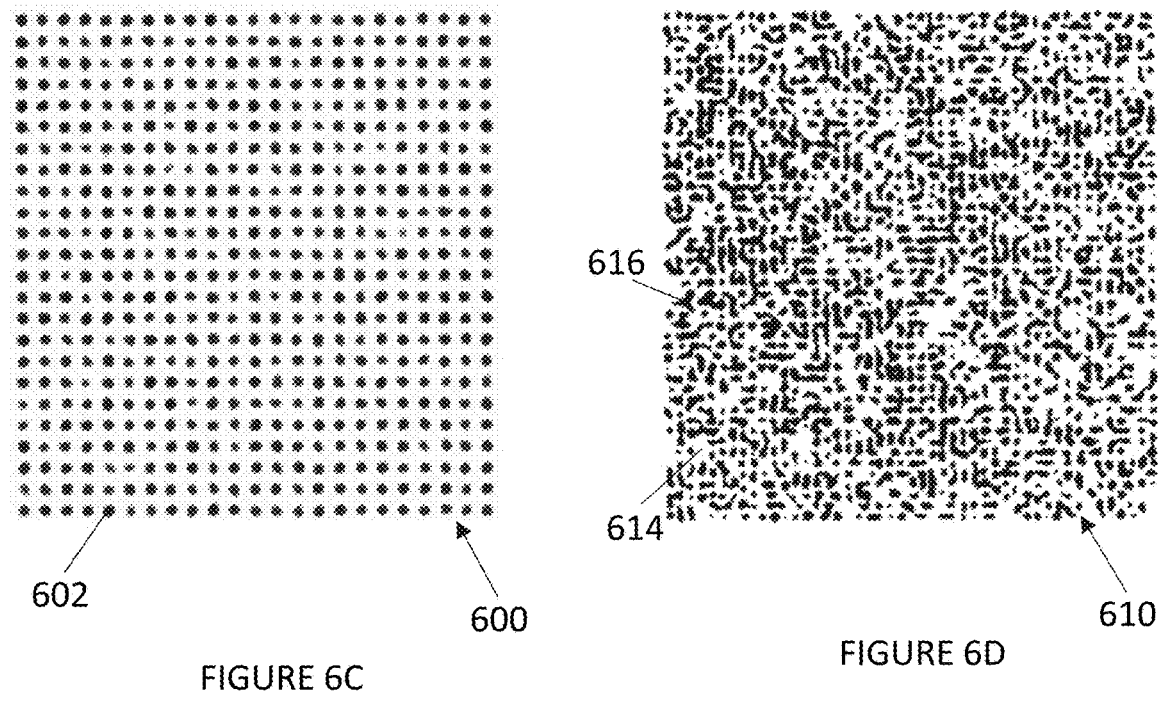
FIG. 6D shows the portion of the second image of FIG. 6B in reality (including interference effects between pixels) and how the relatively smaller pixel spacing in FIG. 6D results in significant deviation from the ideal case as a result of speckle.

FIGS. 6C and 6D represent how the pixels of the portions 602,610 of the images (or holographic reconstructions) appear in reality (including the speckle effect). FIG. 6C shows the portion 600 of the first image but with the speckle effect. FIG. 6D shows the portion 610 of the second image but with the speckle effect.

Because the pixels of the first image (of FIGS. 6A and 6C) have a relatively large spacing, any interference between light of adjacent pixels is minimal. As such, the speckle effect in FIG. 6C is substantially negligible and the pixels maintain their appearance of being in a uniform array. However, the image is unacceptably poor given its low resolution (and so pixelated) nature.

Because the pixels of the second image (of FIGS. 6B and 6D) have a relatively small spacing, the interference between light of adjacent image pixels in the second image is much more significant than in the first image. As such, the speckle effect in FIG. 6D is not substantially negligible. In particular, interference between light associated with pixels of the second image results in dark areas 614 and light areas 616 being formed (which are not present in the idealised case of FIG. 6B). So, as a result of the speckle effect, the image of FIG. 6D does not appear as a uniform points of light but rather is granulated and noisy. So, although the resolution in the second image may be acceptably high so as to, in theory, not appear pixelated, the speckle-effect significantly degrades the quality of the image that is actually perceived.

So, in summary, without speckle mitigation, image quality may either be poor as a result of being too low resolution and appearing pixelated or (at higher resolutions) noisy and so poor because of the speckle-effect.

Figure 7A:
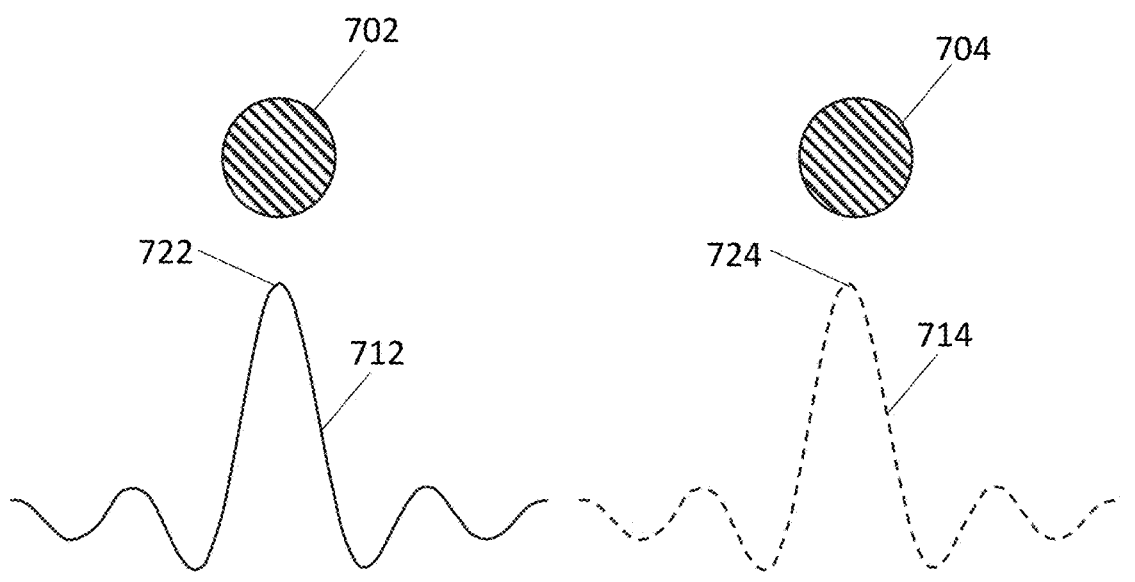
FIG. 7A shows representations of the light field associated with individual pixels of the image of FIG. 6A/6C.
Figure 7B:
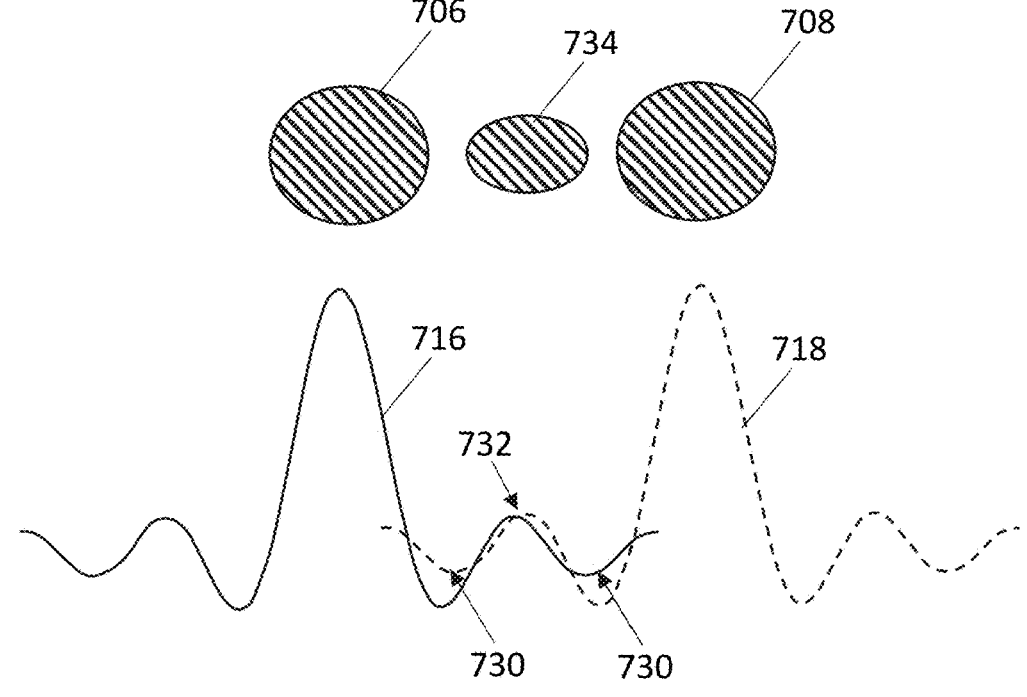
FIG. 7B shows representations of the light field associated with individual pixels of the image of FIG. 6B/6D.

The causes of the speckle shown in FIG. 6D are explained in more detail with reference to FIGS. 7A and 7B. FIGS. 7A and 7B each show representations of the light field associated with individual pixels as well as an intensity profile of the image pixel (which has the form of a sinc squared function). FIG. 7A show representations of the light field associated with individual pixels of the first image (of FIG. 6A/6C). FIG. 7B show representations of the light field associated with individual pixels of the second image (of FIG. 6B/6D).

FIG. 7A represents two adjacent pixels 702, 704 of the first image (of FIG. 6A/6C) and FIG. 7B represents two adjacent pixels 706,708 of the second image (of FIG. 6B/6D). The light associated with each pixel 702 to 708 takes the form of a sinc squared function, also shown in FIGS. 7A and 7B. A first sinc squared function 712 is associated with pixel 702, a second sinc squared function 714 is associated with pixel 704, a third sinc squared function 716 is associated with pixel 706 and a fourth sinc squared function 718 is associated with pixel 708. Only the first and second so-called side-lobes of each sinc squared function (either side of the respective main lobe) are shown in FIGS. 7A and 7B.

As discussed in relation to FIGS. 6A and 6C, the pixels in the first image have a relatively large spacing compared to the pixels of FIGS. 6B and 6D. As such, the two adjacent pixels 702,704 of the first image (shown in FIG. 7A) are further apart than the two adjacent pixels 706,708 (shown in FIG. 7B) of the second image. Each pixel 704 to 708 has an intensity which varies in space substantially in the shape of a sinc squared function. The appearance of the pixels (which are ideally circular) may be affected by interference of the sinc squared functions. In particular, the perceived intensity pattern at any point in space will depend on the sum of the interactions/sum of the value of the sinc squared functions of all the pixels at that respective point in space. For simplicity, two pixels and the respective sinc squared functions are shown in FIGS. 7A and 7B.

The spacing between pixels 702,704 is relatively large, so there is no significant overlap between first and second respective sinc squared functions 712,714, associated with these pixels. Of course, some higher-order side-lobes (not shown in FIGS. 7A and 7B) may interact. But the amplitude of the higher-order side-lobes is so small as to be negligible and so the interference caused by the interaction of the higher-order side-lobes is also negligible. As a result, the main lobes 722,724 of the first and second sinc squared functions 712,714 substantially contribute to substantially circular and spatially separated points of light (pixels 702, 704). The situation is different when the pixels are closer together.

The spacing between pixels 706,708 is relatively small, so there is a significant overlap between the third and fourth sinc squared functions 716,718 associated with these pixels. As can be seen in FIG. 7B, the lobes of the third and fourth sinc squared functions 716,718 are overlapping. In particular, there is some overlap of the second order side-lobes of the third sinc squared function 716 with the main lobe of the fourth sinc squared function 718 (and vice versa). Similarly, the first and second order side-lobes of the third sinc squared function 716 overlap with the first and second order side-lobes of the fourth since function 718. This overlapping resulting in areas of constructive interference and areas of destructive interference. For example, the interaction between the main lobe of each sinc squared function with a second order side lobe of the other sinc squared function is constructive. This constructive interference results in the pixels 706,708 appearing elongated/oval rather than round. The interaction between the side lobes of each sinc squared function (between the main lobes) has two destructive regions 730 and one constructive region 732. The constructive region 732 results in an additional (unintentional) point of light 734 between the pixels 706,708.

For simplicity, FIG. 7B merely shows the interaction of the sinc squared function of two pixels (pixels 706,708). In reality, an image is formed by an array of pixels, with the sinc squared functions of each pixel interacting with at least several other nearby pixels. For example, each pixel may have four adjacent pixels, the light of which each of which may significantly interact/interfere with light of that respective pixel. Thus, the resulting interference pattern is much more complex than that shown in FIGS. 7A and 7B (e.g. see the complex pattern formed in FIG. 6D as a result of speckle/interference. However, it should be clear from the two pixels shown in FIG. 7B how the interference effect of relatively close pixels can degrade image quality. For example, FIG. 7B shows both the effect of the elongation of pixels 706,708 and the introduction of an unintentional bright region between the pixels substantially reduces image quality. In addition, unintentional dark regions may also be created.

The interference described in relation to FIG. 7B and the corresponding reduction in the quality of resulting images is referred to in this disclosure as speckle.

Hologram Processing to Reduce Speckle

Figure 8:
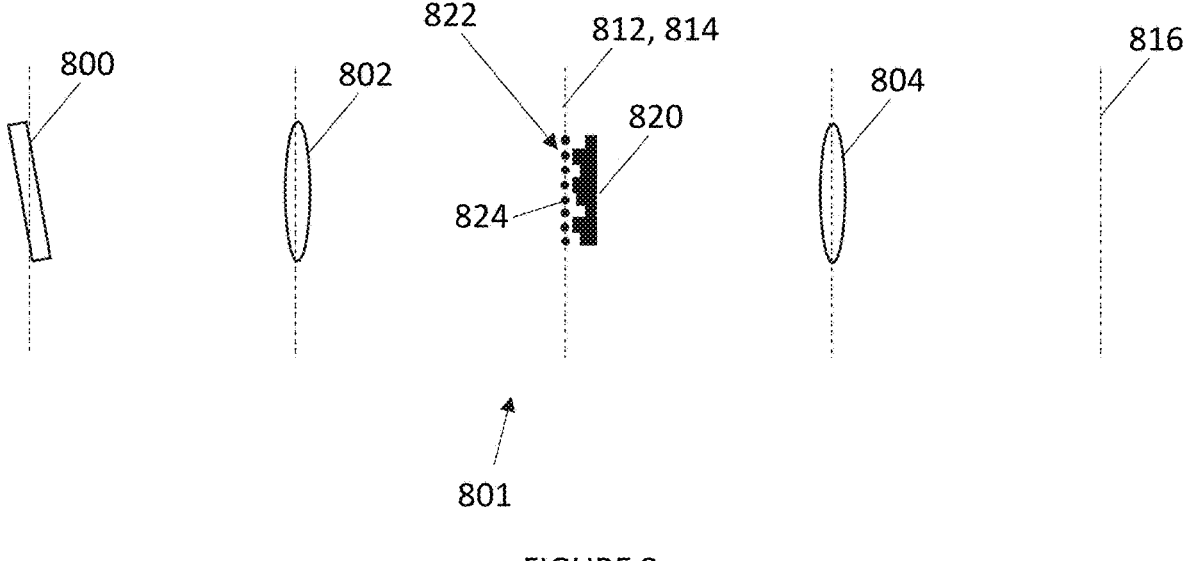
FIG. 8 shows a schematic cross-sectional view showing features of a holographic projector according to the present disclosure.

FIG. 8 is a schematic cross-sectional view showing features of a holographic projector according to the present disclosure. These features are arranged in order to minimise/reduce speckle in the images formed by the holographic projector. In particular, FIG. 8 shows a spatial light modulator 800 (which, in some examples, is a liquid crystal on silicon pixelated spatial light modulator) and a magnifying telescope 801 comprising a first lens 802 (which, in some examples, is first convex Fourier lens) and a second lens 804 (which, in some examples, is a second convex Fourier lens). The first lens 802 comprises a front focal plane 812. The front focal plane 812 corresponds to the plane at which incoming collimated light is focused by the first lens 802 and so the front focal plane 812 depends on, for example, the optical power of the lens. The second lens 804 comprises a back focal plane 814 and a front focal plane 816. The back focal plane 814 and the front focal plane 812 (of the first lens) are aligned so as to form a single surface. In some embodiments, the focal length of the first and second lenses 802, 804 is the same such that the front focal plane 812 and the back focal plane 814 are at the midpoint between the first and second lenses 802,804. However, this is optional. A kinoform 820 (which could also be described as a diffractive optical element) is disposed between the first lens 802 and the second lens 804. The kinoform 820 is disposed substantially at the front focal plane 812 of the first lens 802.

The holographic projector further comprises a movement assembly arranged to move the kinoform 820. As will explained in more detail below, the position and arrangement of kinoform are such that rapid movement of the kinoform 820 with respect to the first lens (e.g. with respect to the optical axis of the first lens) substantially reduces speckle.

During operation of the holographic projector, a hologram of a picture is displayed on the spatial light modulator 800. Light is emitted from a coherent light source (e.g. a laser) of the holographic projector, this light is incident the spatial light modulator 800. The light is spatially modulated in accordance with the hologram displayed on the spatial light modulator 800 to form a holographic wavefront. The holographic wavefront is received by the first (Fourier) lens 802 such that holographic light is transformed to the image domain. The first lens 802 focusses the light to form a holographic reconstruction 822 of the image (of the hologram). The holographic reconstruction 822 is pixelated and is represented by the dots 824 shown in FIG. 8. The holographic reconstruction 822 is formed at the front focal plane 812 of the first lens 802 in the example shown in FIG. 8.

The holographic reconstruction 822 interacts with the kinoform 820. The kinoform 820 applies a phase-delay to each pixel 824 of the holographic reconstruction 822. In particular, the kinoform 820 is arranged such that the phase delay applied to each pixel 824 of the holographic reconstruction 822 is different to the phase-delay applied to each pixel that is adjacent to the respective pixel. After the phase-delay has been applied to each pixel, the holographic reconstruction 822 may be referred to as a modified holographic reconstruction (the modified holographic reconstruction having phase delays applied to the pixels relative to the holographic reconstruction 822). Light of the modified holographic reconstruction is received at the second lens 804 to be transformed/reformed into a holographic wavefront.

Figures 9, 10:
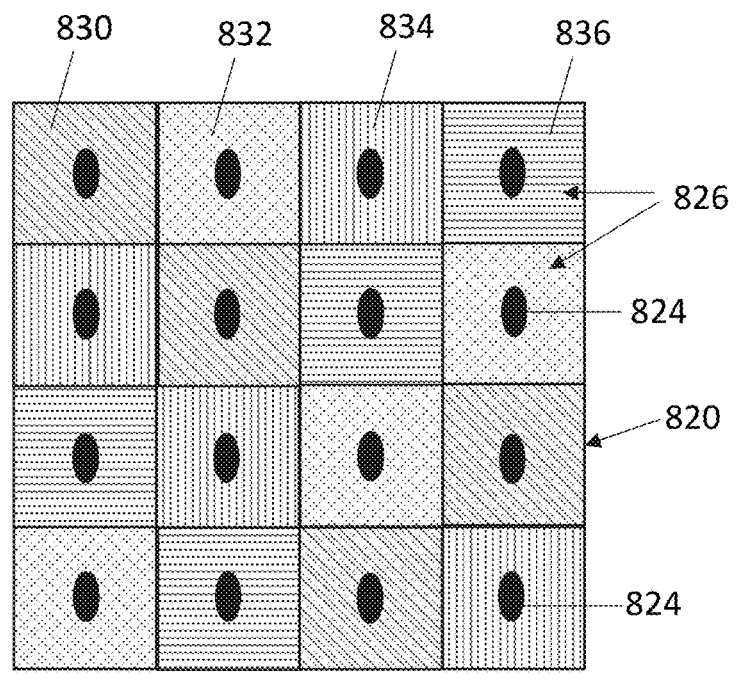
FIG. 9 shows front view of a portion of a kinoform of the holographic projector shown in FIG. 8 show with pixels of a holographic reconstruction superimposed thereon.
FIG. 10 shows a perspective view of the kinoform of FIG. 9.

FIGS. 9 and 10 show a portion of the kinoform 820 in more detail. FIG. 9 is a front view of the portion of the kinoform 820 with dots/pixels 824 of the holographic reconstruction 822 superimposed thereon. The kinoform 820 comprises an array of discrete zones 826. Each zone 826 in the array of zones is substantially square in shape. In this example, the array is a four by four array of zones (in other words, the array comprises 16 zones). Each zone 826 is aligned with a single pixel 824 of the holographic reconstruction 822. The interpixel distance of pixels of the holographic reconstruction is equal to the width and length of the each zone 826. Each zone 826 of the kinoform 820 is arranged to apply a phase-delay having one of four (different) allowable or discrete values. The different phase delays are represented by the different shading of the zones in FIG. 9. In particular, a first phase-delay value is represented by the diagonal shading (see zone 830, for example); a second phase-delay value is represented by the dotted shading (see zone 832, for example); a third phase-delay is represented by the vertical shading (see zone 834, for example; and a fourth phase-delay is represented by the horizontal shading (see zone 836, for example). Each of the first to fourth phase-delay is between 0 and pi radians.

In some examples, the amount of phase-delay applied by the kinoform 820 to each pixel is dependent on the thickness of the kinoform in a particular zone. In such embodiments, the kinoform 820 comprises a transparent material such as glass or quartz having a refractive index greater than 1. Thus, light propagates more slowly through the kinoform 820 than through air and so the phase-delay applied to light associated with each pixel will increase with increasing thickness. FIG. 10 is a perspective view of the kinoform 820 showing how each zone 830 has a thickness and how zones of the same type (i.e. zones arranged to apply the same phase-delay) have the same thickness. In particular, there are four different thicknesses of zones and these correspond to the same order as the zones shown in FIG. 9.

It should be clear that the number of discrete phase-delay values may be less than or greater than four (for example eight). Furthermore, FIGS. 9 and 10 shows only 16 pixels and 16 zones, however it should be clear that this is representative only and not limiting (in fact, generally the number of pixels and zones will be significantly higher than 16).

Applying the phase-delay to the pixels 824 of the holographic reconstruction (in a way which results in the adjacent pixels having different phase-delays applied) changes the speckle pattern of the image formed at the viewing system. This is because the relative phase of the light associated with adjacent pixels is changed and so the interference pattern (e.g. shown, for example, in FIG. 7B) is also changed.

FIG. 9 shows a portion of the kinoform 820 in a first position with respect to the holographic reconstruction 822. However, as described above, in use of the holographic projector, the kinoform 820 is rapidly moved by the movement assembly (not shown in the Figures). The movement assembly is arranged to move the kinoform 820 translationally in a first plane (the normal of the first plane being parallel to an optical axis of the first lens 802). The movement assembly is arranged to move the kinoform 820 from a first position to a second position relative to the holographic reconstruction. The first and second position are represented by FIGS. 11 and 12 respectively.

Figure 11A:
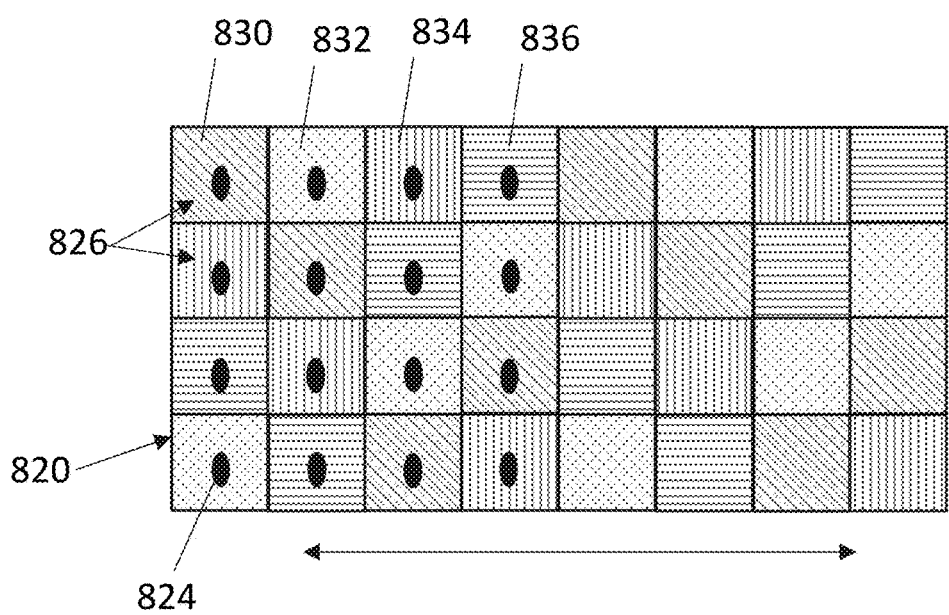
FIG. 11A shows a front view of a larger portion of the kinoform of FIGS. 9 and 10 shown in a first position relative to a holographic reconstruction.
Figure 11B:
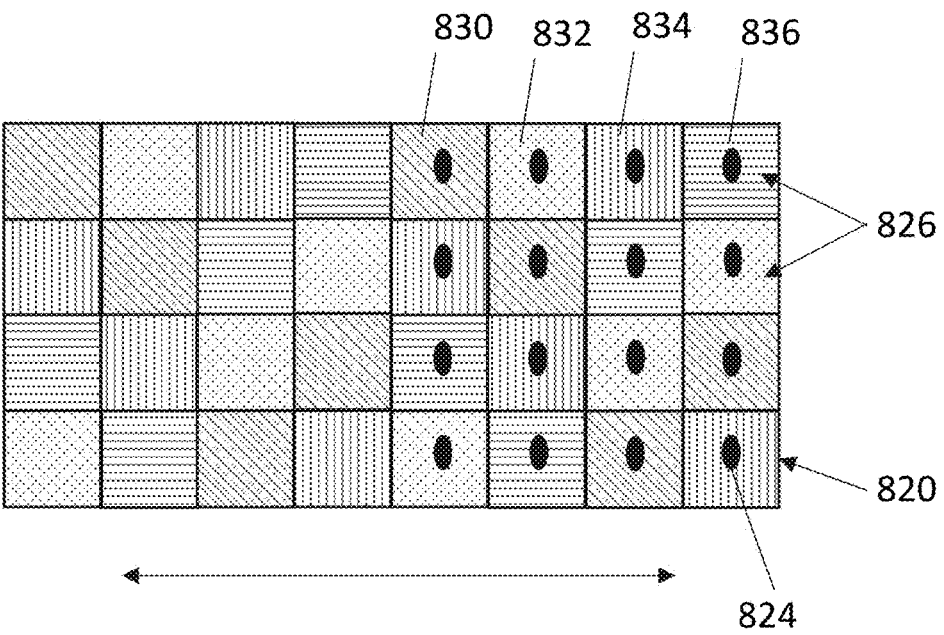
FIG. 11B shows a front view of the larger portion of the kinoform of FIG. 11A shown in a second position relative to the holographic reconstruction.
Figure 12:
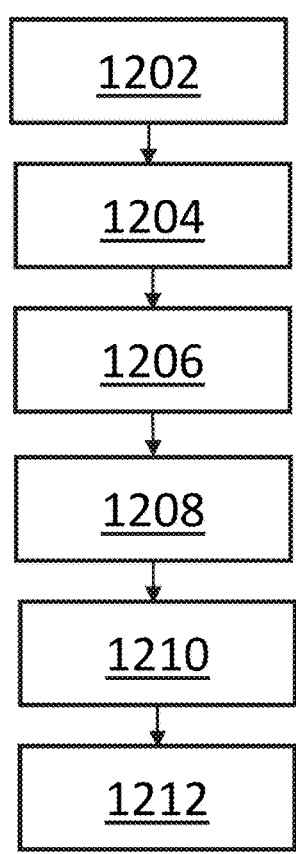
FIG. 12 shows a flow chart of a method of holographic projector according to the present disclosure.

FIGS. 11A and 11B show a larger portion of the kinoform 820 than shown in FIGS. 9 and 10. In particular, FIGS. 11A and 11B show that the kinoform comprises more zones 826 than the holographic reconstruction 822 comprises pixels 824. This means that there are some zones 900 of the kinoform which are not aligned with a pixel 826 in each position. FIGS. 11A and 11B show that the first position and second position are separated be a distance of four pixels (but this is merely optional, other distances between the first and second position are possible). FIGS. 11A and 11B show that, in the second position, each zone 826 of the kinoform 820 is substantially aligned with a different pixel 824 of the holographic reconstruction 822 to the pixel of the first position. It should be clear, that as the kinoform 820 is moved from the first position to the second position (with respect to the holographic reconstruction) each pixel of the holographic reconstruction 822 will be aligned with four different zones and so have four different phase-delays applied. At all times, the phase-delay applied to adjacent pixels is different. So, as the kinoform 820 is moved, four different speckle patterns will be formed at the viewing system.

The inventors have advantageously found that rapidly moving the kinoform between the first and second positions shown in FIGS. 11A and 11B results in a plurality of different speckle patterns being formed at the viewing system. By moving the kinoform at a sufficiently high frequency between the first and second position, this changing speckle pattern is averaged by the optic system of a human observer (because a plurality of different phase-delay values are applied and associated speckle patterns form within the integration time of the human eye). The result is that the appearance of speckle in the holographic reconstruction is reduced. In one embodiment, the inventors have found that a frequency of oscillation between the first and second position of the kinoform of 1 kHz is a suitable value.

In the example above, the kinoform is moved translationally between the first position and the second position. In other examples, the kinoform may be moved rotationally. Furthermore, in the example above, the kinoform is transmissive, with light of the holographic reconstruction being transmitted through the kinoform. In other examples, the kinoform may be reflective. For example, the kinoform may comprise a reflective coating on a back surface arranged to reflect light of the holographic reconstruction.

FIG. 12 shows a flow chart of a method of holographic projector according to the present disclosure and using the holographic projector described above.

Step 1202 of the method comprises displaying a hologram of a picture on a display device (in particular the spatial light modulator 800 described above). Step 1202 may optionally comprise calculating the hologram first. The hologram may be a computationally generated hologram.

Step 1204 of the method comprises spatially modulating light in accordance with the hologram to form the wavefront. This step comprises illuminating the spatial light modulator 800 with a coherent light source (in this example, one or more lasers). The coherent light will be encoded with the hologram to form a holographic wavefront.

Step 1206 of the method comprises forming a holographic reconstruction 822 of the picture by focusing the holographic wavefront towards a front focal plane 812 of a first lens 802. As described in more detail below, in relation to the embodiment of FIG. 13, the exact plane at which the holographic reconstruction is in complete focus may vary, but will generally be substantially at or adjacent to the front focal plane 812 of the first lens 802. The holographic reconstruction 822 of the picture comprises pixels 824.

Step 1208 of the method comprises applying a phase-delay to each pixel of the holographic reconstruction 822 using the kinoform 820 disposed between the first lens 802 and the second lens 804. The zones 826 of the kinoform 820 are arranged to apply a phase-delay to each pixel that is different to the phase-delay of the adjacent pixels. As described above, in one example, there are a discrete number of (e.g. four) different phase-delay values that are applied to the pixels.

Step 1210 of the method comprises moving the kinoform 822 with respect to the holographic reconstruction 822. In this way, different zones 826 of the kinoform 822 are aligned with different pixels of the holographic reconstruction 822 over time. Thus, each pixel of the holographic reconstruction has a plurality of different phase-delays applied thereto. The kinoform 822 is moved (between a first position and a second position) rapidly (for example, at a frequency of 1 kHz). In this way, the phase-delay for each pixel of the holographic reconstruction is changed a plurality of times within the integration time of the human eye. This changes the speckle pattern formed a plurality of times within the integration time of the human high such that the speckle pattern is averaged by the optic system (e.g. eye of a human observer). Thus, the appearance/perception of speckle in the holographic reconstruction is reduced.

Step 1212 of the method comprises receiving light of the modified holographic reconstruction from the kinoform using the second lens. Step 1212 further coupling the modified wavefront into a waveguide having a pair of opposing surfaces arranged to waveguide therebetween, wherein a first surface of the pair of opposing surfaces is partially-reflective partially-transmissive such that a plurality of replicas of the modified holographic wavefront are emitted therefrom.

Figure 13:
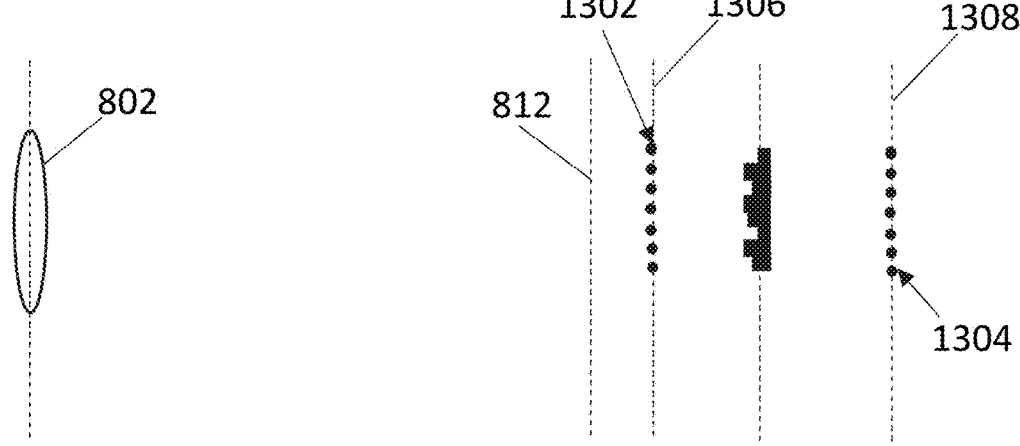
FIG. 13 shows a portion of a second embodiment of the holographic projector according to the present disclosure.

FIG. 13 shows a portion of a second embodiment of the holographic projector according to the present disclosure. The second embodiment is very similar to the first embodiment and like features are numbered accordingly. The main difference between the first embodiment and the second embodiment is that holographic projector of the second embodiment is arranged to display a first virtual image viewable from the eye-box at a first virtual image distance and a second virtual image viewable from the eye-box at a second virtual image distance. In this example, the first virtual image distance is 1.5 meters and the second virtual image distance is 25 meters.

The holographic reconstruction of the embodiment of FIG. 13 comprises a first portion 1302 associated with the first virtual image and a second portion 1304 associated with the second virtual image. The first portion 1302 of the holographic reconstruction is focused at a first plane 1306 and the second portion 1304 of the holographic reconstruction is focused at a second plane 1308. As will be well understood by the skilled person, the exact position where the (intermediate) holographic reconstruction is in focus between the first and second lens depends on the corresponding virtual image distance of the virtual image. In particular, the shorter the virtual image distance, the further the holographic reconstruction will be in focus from the first lens 802 (and the closer it will be to the second lens, not shown in FIG. 13). If the virtual image distance is at infinity, the holographic reconstruction will be formed/in complete focus at the front focal plane 812 of the first lens 802. In this example, the first virtual image distance is less than the second virtual image distance and so the first portion 1302 of the holographic reconstruction is closer to the front focal plane 812 of the first lens 802 than the second portion 1304 of the holographic reconstruction; but both virtual image distances are non-infinite and so the first and second portions 1302, 1304 are not exactly at the front focal plane 812.

The inventors have found that the despeckling effect of the kinoform is maximized/optimized when the kinoform is disposed exactly at a plane of the holographic reconstruction (in complete focus). However, in the example shown in FIG. 13, the holographic reconstruction comprises two portions which are completely focused at two different places. In such cases, the inventors have found that it is advantageous to position the kinoform between the first plane 1306 and the second plane 1308 so that a despeckling effect is achieved at all depths. In particular, and as shown in FIG. 13, the inventors have found that it is advantageous to position the kinoform 820 at the midpoint between the first and second planes 1306,1308.

The holographic projector of FIG. 13 is described as being arranged to form two virtual images at 1.5 meters and 25 meters respectively. This is merely exemplary. The kinoform may be used to reduce the speckle effect at any arbitrary distance of a virtual image and for any number of virtual images at any arbitrary distance. In each case, it is advantageous for the kinoform to be placed at an average position/mid-point between the planes formed by the plurality of portions of holographic reconstructions.

ADDITIONAL FEATURES

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
   a display device arranged to form a holographic wavefront by spatially modulating light in accordance with a hologram of a picture displayed thereon;
   a magnification system comprising a first lens and a second lens, the first lens being arranged to form a holographic reconstruction of the picture by focusing the holographic wavefront substantially at a focal plane of the first lens, wherein the holographic reconstruction of the picture comprises a plurality of pixels;
   a kinoform being disposed between the first lens and the second lens and being arranged to apply a phase-delay to each pixel of the holographic reconstruction such that the phase-delay applied to each pixel is different to the phase-delay of the adjacent pixels; and
   a movement assembly arranged to move the kinoform such that a plurality of different phase-delays are applied to each pixel of the holographic reconstruction within the integration time of the human eye;
   wherein the kinoform comprises an array of zones and is arranged such that the width and/or the height of each zone is substantially equal to the distance between adjacent pixels of the holographic reconstruction, and wherein each zone of the kinoform is arranged to apply a different single phase delay to incident light to a single phase delay applied by an adjacent zone.

2. The holographic projector as claimed in claim 1, further comprising a waveguide comprising a pair of opposing surfaces arranged to waveguide light received from the second lens therebetween, wherein a first surface of the pair of opposing surfaces is partially-reflective partially-transmissive such that a plurality of replicas of the holographic wavefront are emitted therefrom.

3. The holographic projector as claimed in claim 1, wherein the kinoform is disposed substantially at the focal plane of the first lens.

4. The holographic projector as claimed in claim 1, wherein the kinoform is disposed between the first and second lens such that a distance between the focal plane of the first lens and the kinoform is 5 millimeters or less.

5. The holographic projector as claimed in claim 4, wherein the distance between the focal plane of the first lens and the kinoform is 3 millimeters or less.

6. The holographic projector as claimed in claim 1, wherein the movement assembly is arranged to move the kinoform such that the kinoform has a first position with respect to the holographic reconstruction and a second position with respect to the holographic reconstruction and wherein the movement assembly is arranged to move the kinoform between the first position and the second position at a frequency of 100 Hz or greater.

7. The holographic projector as claimed in claim 6, wherein the distance between the first position and the second position of the kinoform is equal to the distance between a first pixel and a second pixel of the holographic reconstruction, the first pixel and second pixel being separated by at least three other pixels.

8. The holographic projector as claimed in claim 7, wherein the kinoform is arranged to apply a phase-delay to each pixel of the holographic reconstruction of between 0 and pi radians.

9. The holographic projector as claimed in claim 1, wherein each zone of the array of zones is arranged to apply a different phase-delay to incident light to the phase-delay applied by the adjacent zones.

10. The holographic projector as claimed in claim 9, wherein the movement assembly is arranged to move the kinoform such that the kinoform has a first position with respect to the holographic reconstruction and a second position with respect to the holographic reconstruction, wherein, in the first position, each pixel of the holographic reconstruction is aligned with a zone of the kinoform.

11. The holographic projector as claimed in claim 10, wherein, in the second position, each pixel of the holographic reconstruction is aligned with a zone of the kinoform that is different to the zone that the respective pixel is aligned with in the first position.

12. The holographic projector as claimed in claim 1, wherein each zone is arranged to apply a phase-delay having one of a plurality of allowable values, the number of allowable values being less than the number of pixels of the holographic reconstruction.

13. The holographic projector as claimed in claim 12, wherein the plurality of allowable values of phase-delay consists of twelve or fewer allowable values.

14. The holographic projector as claimed in claim 13, wherein each zone of the kinoform has a constant thickness.

15. The holographic projector as claimed in claim 1, wherein the width and the height of each zone is substantially equal to the distance between adjacent pixels of the holographic reconstruction.

16. The holographic projector as claimed in claim 1, wherein the second lens is arranged to receive the holographic reconstruction and form a modified holographic wavefront therefrom.

17. A method of holographic projection, the method comprising:

displaying a hologram of a picture;

spatially modulating light in accordance with the hologram to form the holographic wavefront;

forming a holographic reconstruction of the picture by focusing the holographic wavefront towards a focal plane using a first lens, wherein the holographic reconstruction of the picture comprises a plurality of pixels;

applying a phase-delay to each pixel of the holographic reconstruction using a kinoform disposed between the first lens and a second lens, wherein the phase-delay applied to each pixel is different to the phase-delay of the adjacent pixels;

moving the kinoform such that each pixel of the holographic reconstruction has a plurality of different phase-delays applied thereto within the integration time of the human eye; and receiving the holographic reconstruction from the kinoform using a second lens, wherein the first lens and second lens collectively form a magnification system;

wherein the kinoform comprises an array of zones and is arranged such that the width and/or the height of each zone is substantially equal to the distance between adjacent pixels of the holographic reconstruction, and wherein each zone of the kinoform applies a different single phase delay to incident light to a single phase-delay applied by an adjacent zone.

18. The method of holographic projector as claimed in claim 17, further comprising coupling the holographic wavefront into a waveguide having a pair of opposing surfaces arranged to waveguide therebetween, wherein a first surface of the pair of opposing surfaces is partially-reflective partially-transmissive such that a plurality of replicas of the holographic wavefront are emitted therefrom.

19. The method as claimed in claim 17, wherein the width and the height of each zone is substantially equal to the distance between adjacent pixels of the holographic reconstruction.

20. The method as claimed in claim 17, wherein the second lens forms a modified holographic wavefront from the holographic reconstruction.

* * * * *